US007860692B2

(12) United States Patent (10) Patent No.: US 7,860,692 B2
Sakaguchi (45) Date of Patent: Dec. 28, 2010

(54) PARTICLE DATA COMPUTING APPARATUS, AND PARTICLE DATA COMPUTING METHOD

(76) Inventor: Hide Sakaguchi, 2-15 Natsushima-cho, Yokosuka (JP) 237-0061

( * ) Notice: Subject to any disclaimer, the term of this patent is extended or adjusted under 35 U.S.C. 154(b) by 951 days.

(21) Appl. No.: 11/613,626

(22) Filed: Dec. 20, 2006

(65) Prior Publication Data

US 2007/0143034 A1 Jun. 21, 2007

(30) Foreign Application Priority Data

Dec. 20, 2005 (JP) ............................. 2005-366922

(51) Int. Cl.
*G06F 7/60* (2006.01)
(52) U.S. Cl. ............................................. 703/2; 703/6
(58) Field of Classification Search ................ 703/2, 703/6
See application file for complete search history.

(56) References Cited

U.S. PATENT DOCUMENTS

| 6,397,168 | B1 * | 5/2002 | Plecnik et al. ................. | 703/2 |
| 2003/0195725 | A1 * | 10/2003 | Hashash ........................ | 703/2 |
| 2003/0216894 | A1 * | 11/2003 | Ghaboussi et al. ............. | 703/2 |
| 2003/0216895 | A1 * | 11/2003 | Ghaboussi et al. ............. | 703/2 |

FOREIGN PATENT DOCUMENTS

JP 2004-199271 7/2004

OTHER PUBLICATIONS

Nezami et al., A fast contact detection algorithm for 3-D discrete element method, Aug. 2004, Computers and Geotechnics 31, 575-587.*
Clearly et al., Discrete-Element Modelling and Smoothed Particle Hydrodynamics: Potential in the Environmental Sciences, Jul. 2004, Philosophical Transactions: Mathematical, Physical and Engineering Sciences, vol. 362, No. 1822.*
Asmar et al, Validation tests on a distinct element model of vibrating cohesive particle systems, Nov. 2001, Computers and Chemical Engineering 26 785-802.*
Zhao, Three Dimensional Discrete Element Simulation for Granular Materials, 2006, University of Illinois at Urbana-Champaign.*
"On Recent Topics about DEM," an article published in Computational Mechanics, vol. 8, No. 3, 2003, pp. 28-33.
"On Recent Topics about DEM," an article published in Computational Mechanics, vol. 8, No. 3, 2003, pp. 28-32.

* cited by examiner

*Primary Examiner*—Paul L Rodriguez
*Assistant Examiner*—Aniss Chad
(74) *Attorney, Agent, or Firm*—Benesch Friedlander Coplan & Aronoff, LLP

(57) ABSTRACT

When an integrated displacement amount of the particles constituting a contact candidate pair is equal to or more than ¼ (one-quarter) cell or more, likelihood becomes high that the particles of the contact candidate particle pair, which was not in contact with each other, would come into contact with each other. Then, in such high likelihood, data relating to contact candidate particle pairs are updated. With this arrangement, even if contact candidate particle pair data updating is decimated and part of contact determination is accordingly omitted to increase a computing speed of the contact determination, accuracy of simulation will not be reduced. Thus, according to the present invention, the computing speed of the contact determination can be increased without lowering the accuracy of simulation.

12 Claims, 8 Drawing Sheets

PARTICLE DATA COMPUTING APPARATUS, AND PARTICLE DATA COMPUTING METHOD

BACKGROUND OF THE INVENTION

The present invention relates to a computer-readable medium including a particle data computing program for computing particle data used in simulation which is carried out in a computer, based on a discrete element method (DEM), a particle data computing apparatus that is operated using the program, and a particle data computing method used when the program is executed.

As described in "On Recent Topics about DEM" (Non-patent document 1) which is an article published in "Computational Mechanics" (Vol. 8, No. 3, 2003, pp. 28-33), the DEM is employed when motions of underground particles (or rocks) during a landslide are simulated, or when motions and related circumstances of particles (gravel) around a pipe which has been laid underground are simulated. In the DEM, while numerically integrating an equation of motion with respect to each particle at intervals of a short time step $\Delta t$, physical quantities with respect to a motion of each particle are updated. Steps in the DEM are broadly classified into the following three steps of:

1) Contact determination
2) Contact force computation
3) Updating of physical quantities with respect to a motion of each particle using numerical integration Then, in the DEM, on only a pair of particles determined to be in contact with each other as a result of the contact determination (step 1), the computations (steps 2 and 3) of the contact force and the updating of the physical quantities with respect to the motion of each particle are performed. For this reason, when the process of the contact determination (step 1) is performed at a higher speed, an overall computing speed can be increased. Since the situation that one particle is in contact with another particle or comes away from another particle is changing step by step, it is considered that the contact determination on each particle itself is necessary for each step.

Computation of distances among all the particles in order to perform the contact determination on each particle for each step will become a great burden to the computer, resulting in a significant reduction of the computing speed. However, when the time step $\Delta t$ is a small value, the motion of each particle within one step is small. For this reason, it can be considered that combinations of a particle which is present in the neighborhood of a focused particle or a particle on which attention is focused but is not in contact with the focused particle, and other particles located in the neighborhood of the focused particle, namely, combinations of contact candidate particle pairs remain almost unchanged. Then, on the grounds that a motion of each particle is small within one step, it is conceived that the contact determination is not performed for several steps and existing contact candidate particle pairs are utilized without alteration. Actually, in order to perform a high-speed operation of the processing, an algorithm as described above is incorporated into some simulation techniques that use the DEM. However, partial omission of the contact determination as described above will lead to computation of a force between particles that are not in contact with each other or failure to compute a contact force between particles actually in contact with each other. Reliability on a result of the simulation may be therefore greatly degraded.

SUMMARY OF THE INVENTION

An object of the present invention is to provide a computer-readable medium including a particle data computing program, a particle data computing apparatus, and a particle data computing method that can increase a computing speed of contact determination and can also prevent a reduction in accuracy of simulation.

Another object of the present invention is to provide a computer-readable medium including a particle data computing program, a particle data computing apparatus, and a particle data computing method that rationally determine updating timing of contact candidate particle pairs and can thereby increase the computing speed of contact determination and can also thereby prevent the reduction in the accuracy of simulation.

Still another object of the present invention is to provide a computer-readable medium including a particle data computing program, a particle data computing apparatus, and a particle data computing method that can reduce a rewriting amount for a memory, thereby achieving faster computations.

The present invention is directed to a computer-readable medium including a particle data computing program for computing particle data or the particle data computing program. The particle data are used in simulation which is carried out in a computer, based on a discrete element method (DEM). The program of the present invention causes the computer to execute the following steps and the method of the present invention performs the following steps: a region dividing step, a mapping step, a contact candidate particle pair determination step, a contact candidate particle pair storage step, a physical quantity computation step, a coordinate data updating step, a displacement amount determination step, a contact candidate particle pair data updating step, and a repetition step.

In the region dividing step, a region including a plurality of particles identified by coordinate data is divided into a plurality of cells. Identification of a particle by the coordinate data herein means identification of a location of the particle using numerical values on a plurality of coordinate axes set for the region. Accordingly, the coordinate data on the particle provide data on the accurate location of the center of the particle. Each of the cells obtained by division of the region is a unit of the subdivided region, and may be arranged two-dimensionally or three-dimensionally. A two-dimensional shape of each cell that is easy to handle is a square. A three-dimensional shape of each cell that is easy to handle is a regular cube or a regular hexahedron. Other shapes may be of course employed. The particle is an object, a motion of which is simulated by the simulation. Preferably, the size of a cell is set to be large enough to accommodate a focused particle. If the shape of the cell is a square and the shape of the particle is a circle, it is preferable that the length of a side of the cell is set to be larger than the diameter of the particle.

In the mapping step, an address is assigned to each of the cells so that when one of the cells is used as a reference cell, it can be known how many cells other cells are located apart from the reference cell in a two-dimensional direction or a three-dimensional direction, to create a cell data memory. Next, a plurality of the cells where centers of the particles are located respectively are identified based on the coordinate data for the particles, and data which identify the plurality of the cells where the centers of the particles are located respectively are stored in the cell data memory.

Next, in the contact candidate particle pair determination step, attention is focused on one of the particles as a focused particle, and it is determined, based on the address of each of the cells, that the focused particle and each of other particles, of which the centers are located in adjacent cells to the cell where the focused particle is located, constitute a contact candidate particle pair. The contact candidate particle pair determination step is carried out or performed on each of the particles within the cells. "Being adjacent" herein refers to a state where no cells are present between the focused particle and another cell. Accordingly, when the cell shape is a two-dimensional square, eight cells located around the cell where the focused particle is located or the reference cell become "adjacent cells". This contact candidate particle pair determination step is performed on each particle within the cells. Accordingly, when the number of particles is increased, a significant number of contact candidate particle pairs will be determined. Then, in the contact candidate particle pair storage step, data on the contact candidate particle pair determined in the contact candidate particle pair determination step are stored in a contact candidate particle pair data memory.

In the mapping step described before, when the cells are arranged two-dimensionally, the address of the reference cell is set to (0, 0) and the address of the other cell is expressed in ($\pm p$, $\pm q$). When the cells are arranged three-dimensionally, the address of the reference cell is set to (0, 0, 0) and the address of the other cell is expressed in ($\pm p$, $\pm q$, $\pm r$). In this case, p, q, rare integers indicating a number in the arrangement order in which the other cell is located with respect to the reference cell in a plus direction or a minus direction of the respective dimensions. In the contact candidate particle pair determination step, when the addresses are set as described above, and when the other particle is located in a cell for which absolute values of numeric differences between the address of the reference cell where the focused particle is located and the address of the other cell where the other particle is located are 1 (one) or less, the focused particle and the other particle are determined to be the contact candidate particle pair. With this arrangement, using the numeric values of the addresses, the contact candidate particle pair can be readily determined by computations.

In the physical quantity computation step, it is determined whether or not the particles of the contact candidate particle pair are in contact with each other. This determination is made by computations based on the coordinate data for the particles. Since the sizes of the particles are known in advance, whether or not the particles of the contact candidate particle pair are in contact with each other can be determined by the computations based on the coordinate data for the particles. Then, based on a location of one particle after a unit time has elapsed, a contact force between the one particle and other particle in contact with the one particle and a contact force between the one particle and other particle highly likely to come into contact with the one particle are computed. Then, based on a computed total value of the contact forces (integrated numeric values), physical quantities (locations and velocities) with respect to motions of the particles are computed and are stored in a physical quantity data memory. These computations correspond to the steps of 1) contact determination, 2) contact force computation, and 3) updating of physical quantities with respect to a motion of each particle using numerical integration in the processing in the DEM. In the present invention, on only the particles constituting the contact candidate particle pairs, the contact determination, contact force computation, and updating of the physical quantities with respect to the motion using the numerical integration are performed. For this reason, a computing speed of the overall processing will be increased more than in a case where these computations are performed on all particles within the region.

In the coordinate data updating step, the coordinate data on each of the particles is updated based on results of computations (more specifically, the locations of the particles) in the physical quantity computation step. The updated coordinate data on each of the particles is stored in a coordinate data memory. Since updating of the physical quantities is not performed on the particles other than those of the contact candidate particle pairs, coordinate data used before the current coordinate data updating are used without alteration. The updating is performed on the particles that have newly constituted the contact candidate particle pair as well.

Next, in the displacement determination step, it is determined based on the results of computations in the physical quantity computation step whether or not an integrated displacement amount of any of the particles constituting the contact candidate particle pair is equal to or more than a predetermined amount integrated displacement (specifically, ¼ (0.25) cell or more). The integrated displacement amount herein means an integrated value of displacement amounts that have been computed in the physical quantity computation step until an updating is performed in a contact candidate particle pair data updating step. When the integrated displacement amount which is equal to or more than the predetermined integrated displacement amount (specifically ¼ cell or more) is determined, the process is returned to the mapping step from the contact candidate particle pair data updating step, and each of the subsequent steps is executed. The present invention is based on a concept that when an integrated displacement amount which is equal to or more than the predetermined amount (specifically, ¼ cell or more) is generated in either of the particles constituting the contact candidate particle pair, there is a high possibility that the particles of the contact candidate pair that was not in contact with each other at an immediately preceding step would come into contact with each other. In the present invention, when a situation as described above has occurred, the process is returned to the mapping step, and then the pair data on the contact candidate particle pairs is updated. When updating timing for the contact candidate particle pairs is set as in the present invention, the pair data on the contact candidate particle pairs will be updated when a possibility becomes high that the particles of the contact candidate particle pair would come into contact with each other. Thus, even if the contact determination is partly omitted to increase a computing speed of the contact determination, accuracy of the simulation will not be reduced. When the integrated displacement amount which is equal to or more than the predetermined integrated displacement amount (specifically, ¼ cell or more) is not determined in the displacement amount determination step, a repetition step of repeating the physical quantity computation step, the coordinate data updating step, and the displacement amount determination step at predetermined time intervals is executed by the computer. In other words, in the present invention, when there is no possibility that particles would get newly in contact with each other, physical quantity computation is continuously performed on the contact candidate particle pairs that have been determined. Accordingly, even if the number of updating the contact candidate particle pairs is reduced, computation accuracy will not be reduced.

When updating the pair data on the contact candidate particle pairs, the following steps may increase a speed of rewriting the memory, thereby resulting in a further increase in the computing speed of the overall processing. When the integrated displacement amount which is equal to or more than the predetermined integrated displacement amount is determined in the displacement amount determination step described before, the mapping step and the contact candidate particle pair determination step are executed again. Then, the subsequent contact candidate particle pair data updating step is executed. In the contact candidate particle pair data updating step, data relating to the contact candidate particle pair that was formerly the contact candidate particle pair but is no longer the contact candidate particle pair after the updating are deleted from the contact candidate particle pair data memory. Then, data relating to the contact candidate particle pair that was not formerly the contact candidate particle pair, but has newly become the contact candidate particle pair after the updating are added to the contact candidate particle pair data memory. Data relating to the remaining contact candidate particle pairs which are still the contact candidate particle pairs after the updating are retained without alteration. With this arrangement, the pair data can be updated just by deletion and addition of the data. Consequently, an operation of rewriting the data is facilitated, and the computing speed is also increased. Preferably, the contact candidate particle pair data memory stores the data in a link list structure, where data relating to each of the contact candidate particle pairs have a reference to next data relating to a next contact candidate particle pair.

In the contact candidate particle pair data updating step, for example, the contact candidate particle pair to be deleted and the contact candidate particle pair to be added can be determined as follows. First, it is checked whether or not absolute values of numeric differences between the addresses of two of the cells where two particles formerly constituting the contact candidate particle pair are located respectively are more than 1 (one). Then, it is determined that the two particles are no longer the contact candidate particle pair when the absolute values are more than 1 (one). In respect of the contact candidate particle pair newly determined as a contact candidate particle pair in the contact candidate particle pair determination step, it is checked whether or not absolute values of numeric differences between the addresses of two of the cells where two particles newly determined as a contact candidate particle pair were formerly located respectively are more than 1 (one). Then, it is determined that the two particles are a contact candidate particle pair which has newly become the contact candidate particle pair after the updating.

A particle data computing apparatus that implements a particle data computing method of the present invention and computes particle data used in simulation which is carried out in a computer by the discrete element method comprises region dividing means, mapping means, contact candidate particle pair determination means, contact candidate particle pair storage means, physical quantity computation means, coordinate data updating means, displacement amount determination means, and contact candidate particle pair data updating means. The region dividing means divides a region including a plurality of particles identified by coordinate data into a plurality of cells. The mapping means assigns an address to each of the cells so that when one of the cells is used as a reference cell, it can be known how many cells other cells are located apart from the reference cell in a two-dimensional direction or a three-dimensional direction. Then, the mapping means identifies, based on the coordinate data for the particles, a cell in which a center of each of the particles is located, and stores in a cell data memory data which identify the plurality of the cells where the centers of the particles are located respectively. The contact candidate particle pair determination means focuses attention on one of the particles as a focused particle. It then determines, based on the address of each of the cells, that the focused particle and each of other particles, of which the centers are located in adjacent cells to the cell where the focused particle is located, constitute a contact candidate particle pair. The contact candidate particle pair determination means makes the determination on each of the particles within the cells. A contact candidate particle pair memory stores data on the contact candidate particle pair determined by the contact candidate particle pair determination means. The physical quantity computation means determines whether or not the particles of the contact candidate particle pair are in contact with each other, and computing physical quantities relating to motions of the focused particle, the other particle in contact with the focused particle, and the other particle very likely to come into contact with the focused particle, based on a location of the focused particle after a unit time has elapsed. Results of computations by the physical quantity computation means are stored in a physical quantity memory. The coordinate data updating means updates the coordinate data on the particles based on the results of computations by the physical quantity computation means. The displacement amount determination means determines, based on the results of computations by the physical quantity computation means, whether or not an integrated displacement amount of any one of the particles constituting the contact candidate particle pairs is equaled to or more than a predetermined integrated displacement amount which is equal to or more than ¼ (one-quarter) of the cell. The contact candidate particle pair data updating means re-executes the mapping means and the contact candidate particle pair determination means for updating, and then deletes from the contact candidate particle pair data memory data relating to the contact candidate particle pair which was formerly the contact candidate particle pair before the updating but is no longer the contact candidate particle pair after the updating, adds to the contact candidate particle pair data memory data relating to the contact candidate particle pair which was formerly not the contact candidate particle pair before the updating but newly becomes the contact candidate particle pair after the updating, and retains without alternation in the contact candidate particle pair data memory data relating to the remaining contact candidate particle pairs which are still the contact candidate particle pairs after the updating. When the integrated displacement amount of ¼ cell or more is not determined by the displacement amount determination means, the physical quantity computation means, the coordinate data updating means, and the displacement amount determination means are executed at predetermined time intervals, recurrently.

According to the present invention, by rationally decimating updating of the contact candidate pairs rather than decimating the contact determination itself, partial omission of the contact determination can be performed as a result, and the computing speed of the contact determination can be thereby increased. A reduction in accuracy of simulation can also be thereby prevented. According to the present invention, updating timing for the contact candidate pairs can also be rationally determined. Accordingly, are writing amount for the memory can be reduced, and faster computations can be thereby achieved.

DETAILED DESCRIPTION OF PREFERRED EMBODIMENT

A particle data computing program that implements a particle data computing method of the present invention is included in a computer-readable medium. The particle data computing program according to an embodiment of the present invention will be described below in detail with reference to drawings.

The procedure in DEM (Discrete Element Method) are broadly grouped into three steps as follows:

1) Contact determination as to whether or not two particles are in contact with each other, 2) Computation of a contact force between the particles, and 3) Updating of physical quantities with respect to a motion of each particle using numerical integration.

Then, in the DEM, in respect only of particle pairs for which the paired particles are determined to be in contact with each other as a result of step (1) contact determination, steps (2) computations of the contact force between the particles and (3) updating of the physical quantities of the motion of each particle are performed. For this reason, the process of the determination whether the paired particles are in contact with each other is a rate-controlling stage. More specifically, among the three steps (1) through (3), it is step (1) determination of the contact particle pairs that most reduces the computing speed of the overall processing in the DEM method. Accordingly, the speed of step (1) determination of the contact particle pairs will dominate a response rate of the overall processing.

The present invention has been made in view of the above-mentioned respect. Basically, determination of contact particle pairs, in other words, whether or not two particles are in contact with each other, involves computation of squares of differences between respective coordinate components of the paired particles and computation of square roots of the squares of the differences between the respective coordinate components, which are necessary for computation of the distance between the particles. Thus, the determination of the contact particle pairs imposes a comparatively heavy load on a computer. Accordingly, the number that the step for determining contact particle pairs is performed should be reduced as much as possible. In other words, an algorithm, by which it is determined the least that two particles are not in contact with each other, constitutes an "efficient contact determination routine". Hence, before determining whether or not the paired particles are in contact with each other, it becomes necessary to narrow down candidate contact particle pairs.

Figure 1:
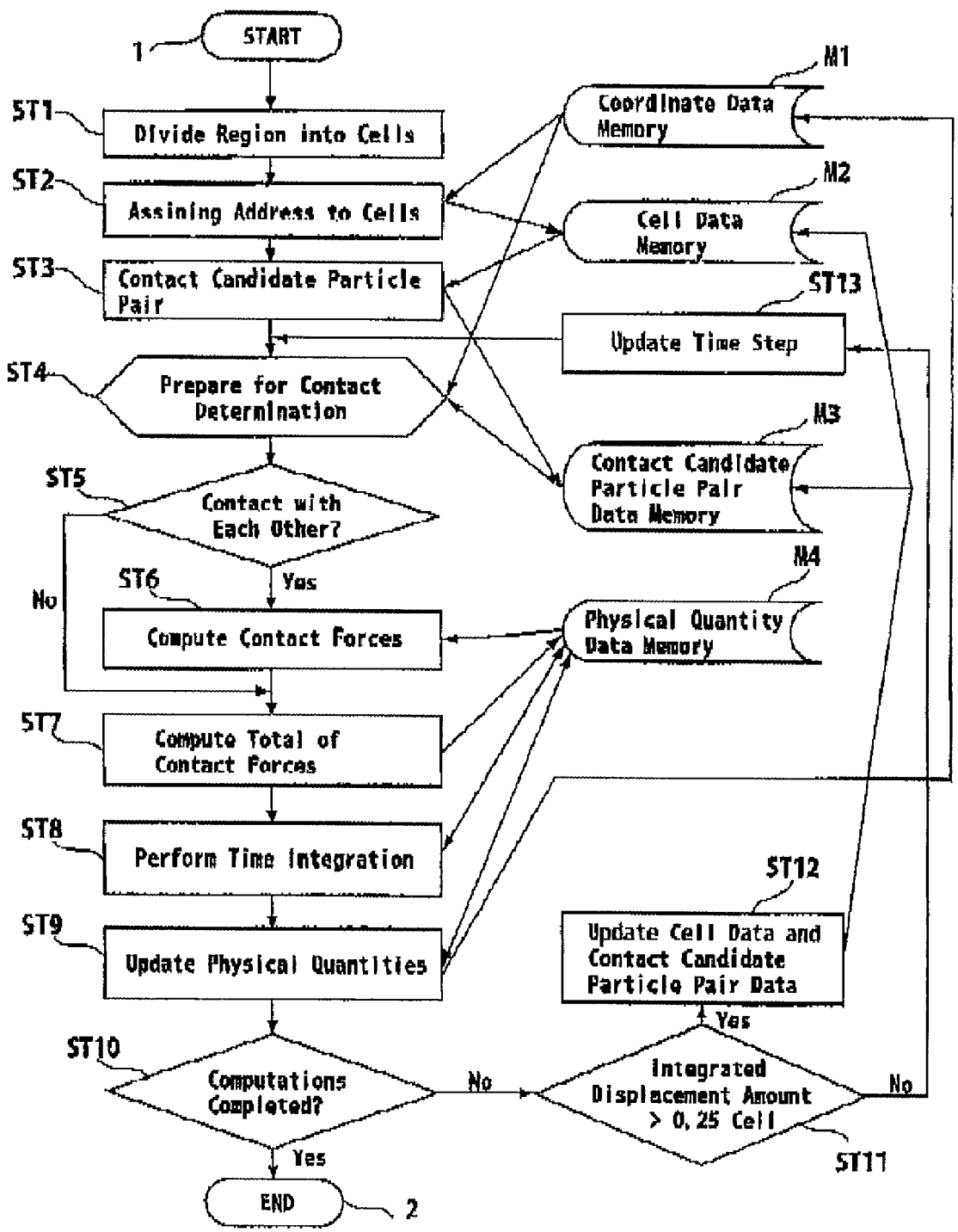
FIG. 1 is a flowchart showing an algorithm of a particle data computing program of the present invention to be executed in a computer, together with related memories.
Figure 2:
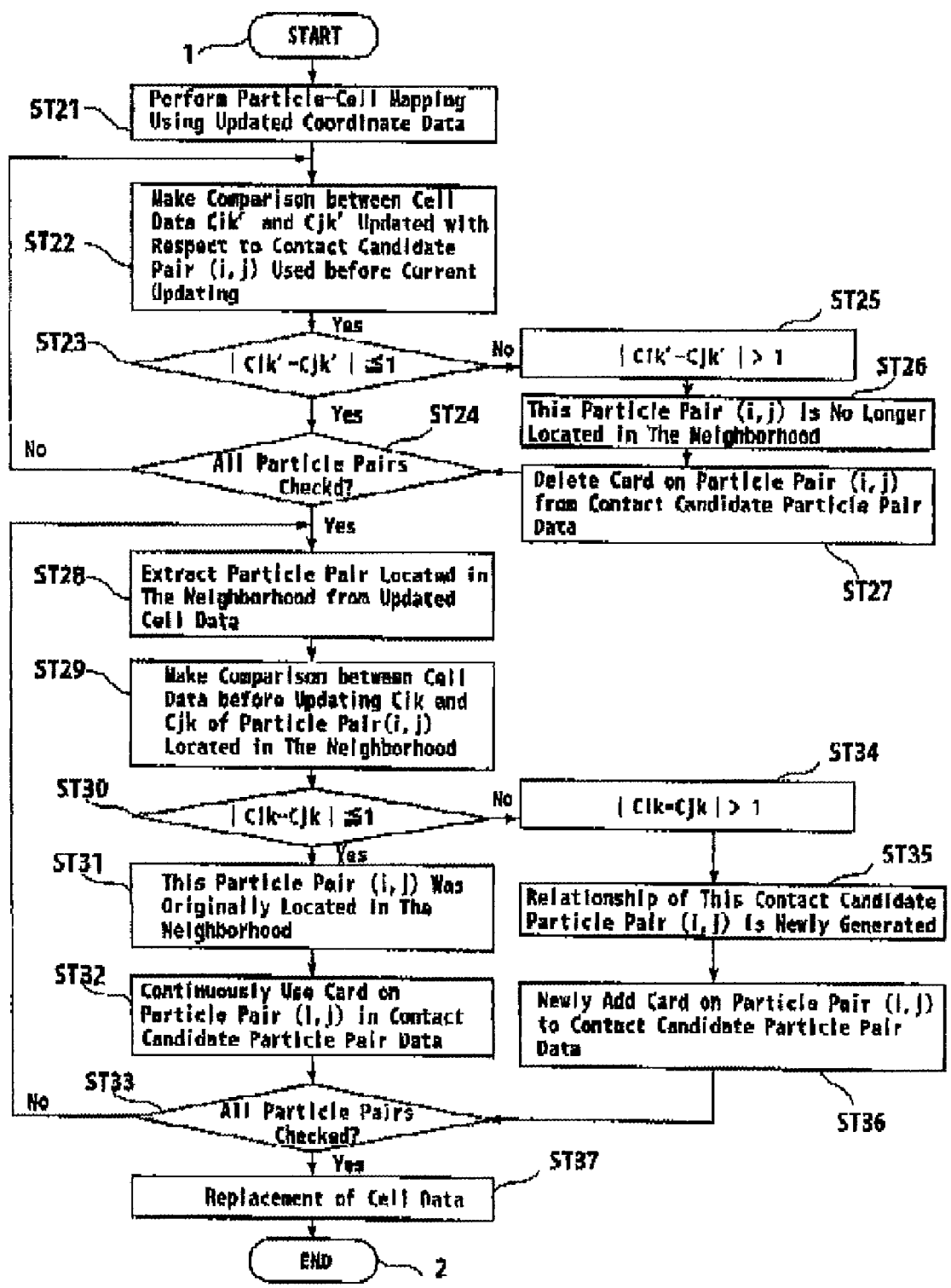
FIG. 2 is a flowchart showing algorithms of some of the steps in the flowchart of FIG. 1 in further detail.

FIG. 1 is a flowchart showing an algorithm of the particle data computing program of the present invention to be executed in the computer, together with related memories. FIG. 2 is a flowchart showing the algorithm of some of the steps shown in the flowchart in FIG. 1 in further detail. A program of this embodiment causes the computer to execute a region dividing step, a mapping step, a contact candidate particle pair determination step, a contact candidate particle pair storage step, a physical quantity computation step, a coordinate data updating step, a displacement amount determination step, a contact candidate particle pair data updating step, and a repetition step.

In the program of this embodiment, narrowing down of the contact candidate particle pairs (Pairs candi) is performed by a well known grid method or linked-cell method. In order to use the grid method, it is necessary to divide a region where particles are present into a plurality of cells. When the DEM is applied to simulation of a cliff landslide, for example, a region of the cliff is predetermined as a region where the particles are present. Then, a stone or a rock buried underground becomes a particle. First, in step ST1 of region dividing, a region including a plurality of particles, which are respectively identified by coordinate data determined in advance in order to execute the simulation, is divided into a plurality of cells. The coordinate data are stored in a coordinate data memory M1. The coordinate data herein are defined to be the data that identify locations of particles used in the simulation based on two-dimensional or three-dimensional coordinates set for a region of interest.

Figure 3:
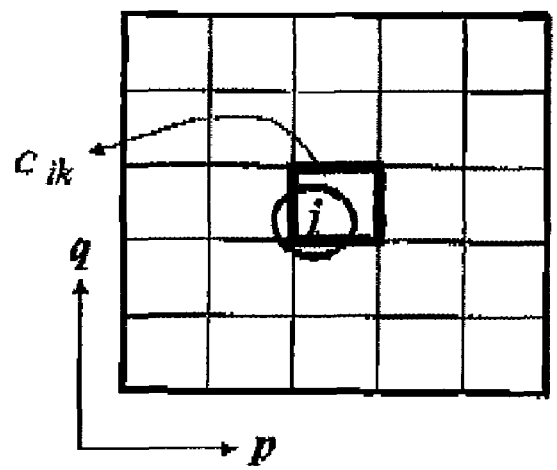
FIG. 3 is an explanatory illustration showing the designation of a cell.

When the simulation is carried out, the cells obtained by dividing the region may be arranged two-dimensionally or three-dimensionally. In a two-dimensional arrangement, a cell shape that is easy to handle is a square. In a three-dimensional arrangement, a cell shape that is easy to handle is a regular cube. In order to simplify the descriptions and to facilitate understanding of the invention, the following descriptions are directed to the cells which are two-dimensionally arranged. FIG. 3 shows an example of the cells arranged two-dimensionally. Referring to FIG. 3, a circle indicates a particle, and reference character i in the circle indicates the name of the particle. Preferably, the size of a cell is set to be large enough to accommodate therein the particles to be handled in the simulation. When the shape of the cell is a square and the shape of the particle is a circle, it is preferable that the length of a side of the cell is set to be larger than the diameter of the particle.

Next, in step ST2 of mapping, an address is assigned to each cell so that, when a certain cell among the cells is used as a reference cell, it can be known how many cells other cells are located apart from the reference cell in a two-dimensional or three-dimensional direction. Then, based on the coordinate data for the particles described before, a cell where the center of a particle is located is identified, and the address of the cell where the center of the particle is located is stored in a cell data memory M2. Actually, in addition to the address of the cell, a designation capable of identifying the particle whose center is located within that cell is also assigned, and both of the address and the designation are stored in the cell data memory M2.

In the example shown in FIG. 3, a designation Cik is assigned to the cell where a particle i is present. A particle on which attention is focused is hereinafter referred to as a focused particle. The number of the focused particle is indicated by i, and the number of the cell to which the particle i belongs in a k direction is indicated by Cik. The k direction in the two-dimensional arrangement is constituted by $\pm p$ and $\pm q$ dimensions, while the k direction in the three-dimensional arrangement is constituted by $\pm p$, $\pm q$, and $\pm r$ dimensions. Herein, the address of the reference cell is represented by (0, 0), and the address of other cell is represented by ($\pm p$, $\pm q$). When the cells are three-dimensionally arranged, the address of the reference cell can be represented by (0, 0, 0), and the address of other cells can be represented by ($\pm p$, $\pm q$, $\pm r$). Herein, p, q, and r are integers indicating a number in the arrangement order in which the other cell is located with respect to the reference cell arranged in a plus or minus direction of each dimension (the first, second and third dimensions in this order) from the reference cell.

Next, in step ST3 of contact candidate particle pair determination, contact candidate particle pair determination is made on each particle within the cells, based on addresses stored in the cell data memory M2. When the center of other particle is located in one of adjacent cells to the cell where the focused particle is located, the focused particle and the other particle are determined to be a contact candidate particle pair. "Being adjacent" herein refers to a state where no cells are present between the focused particle and another cell. Accordingly, when the cell shape is a two-dimensional square, eight cells located around the cell where the focused particle is located or the reference cell become "adjacent cells". Step ST3 of contact candidate particle pair determination is performed on each particle within the cells. Accordingly, when the number of particles is increased, a significant number of contact candidate particle pairs will be determined. Then, in the contact candidate particle pair storage step, data on the contact candidate particle pairs determined in step ST3 of contact candidate particle pair determination is stored in a contact candidate particle pair data memory M3.

In step ST3 of contact candidate particle pair determination, when the center of the other particle is located in the cell that satisfies a condition that absolute values of numeric differences between the cell addresses for the focused particle and each of other particles are 1 (one) or less, the focused particle and the other particle are determined to be a contact candidate particle pair. With this arrangement, using the numeric values of the addresses of the cells, the contact candidate particle pairs can be readily determined by computation. A method of determining the contact candidate particle pairs and updating timing for the contact candidate particle pairs will be described later in detail.

Among steps ST4 through ST8 of physical quantity computation, it is first determined in the steps ST4 and ST5 whether or not the particles of each contact candidate particle pair are in contact with each other. In step ST5, it is determined through computations based on the coordinate date for the particles, whether or not the particles are in contact with each other. In order to do so, in step ST4, data on the contact candidate particle pair is obtained from a contact candidate particle pair data memory M3, and the coordinate data on the particles constituting the contact candidate particle pair is obtained from the coordinate data memory M1. Then, since the size of the particle set in advance is known, the distance between the centers of the two particles of the contact candidate particle pair is computed based on the coordinate data for the respective particles in step ST5. Then, from the computed distance between the centers of the two particles of the contact candidate particle pair, it is determined whether or not the two particles of the contact candidate particle pair are in contact with each other.

Next, based on a location of one of the particles (focused particle) constituting the contact candidate particle pair after a unit time has elapsed, a contact force between the focused particle and other particle in contact with the focused particle and a contact force between the focused particle and other particle highly likely to come into contact with the focused particle (hereinafter also referred to as a neighboring particle) are computed in step ST6. Referring to the location of the focused particle after the unit time has elapsed, it is assumed that the particle first changes its location (is displaced) using gravity that acts on the particle as an external force applied to the particle, for example. Then, provided that the gravity acts on each particle, forces that act on the focused particle (which is referred to as the contact forces) are computed. More specifically, a gravity vector applied to the focused particle and a vector of a force applied from at least one neighboring particle become the contact forces applied to the focused particle. When the contact forces are computed, data on (a total of) contact forces on each of the particles that have been stored in the physical quantity data memory M4 are used. Then, a synthesis vector of the contact forces is computed as a total of the contact forces in step ST7. A result of computation of the total of the contact forces is stored in the physical quantity data memory M4. The result of computation of the total of the contact forces is then time integrated in step ST8. Then, by integrating numeric values obtained by the time integration, the physical quantities with respect to motions of the focused particle and at least one neighboring particle (specifically, locations and velocities of the focused particle and at least one neighboring particle) are computed in step ST9, and the results of computations are stored in the physical quantity data memory M4.

When physical quantities previously stored in the physical quantity data memory M4 and the physical quantities obtained as the result of the current computation are different, the physical quantities are updated in step ST9. Then, based on the updated physical quantities, the coordinate data for each of the particles stored in the coordinate data memory M1 are updated in the coordinate data updating step. More specifically, using the physical quantities obtained by the computations, the coordinate data for each of the particles stored in the coordinate data memory M1 are changed. Since the physical quantities of the particles other than the contact candidate particle pairs are not updated, the existing coordinate data are retained without alteration and used.

The computations described so far correspond to steps 1) contact determination (determination of contact candidate particle pair), 2) contact force computation, 3) updating of physical quantities with respect to motions using numerical integration in the DEM. In this embodiment, these computations are performed on only the particles constituting the contact candidate particle pairs, and the contact determination, contact force computation, and the updating of the physical quantities with respect to the motions of the particles using the numerical integration are performed. When the computations are performed on only the contact candidate particle pairs as described above, a computing speed of the overall processing will be increased more than in a case where these computations are performed on all particles within the region. A unit time for performing the computations is arbitrarily set according to a target for the simulation.

When it is determined that the computations on the particles constituting all the contact candidate particle pairs have been completed in step ST10, the process proceeds to step ST11 of displacement amount determination. In step ST11 of displacement amount determination, it is determined based on the result of the computations in steps ST4 through ST8 of physical quantity computation whether or not an integrated displacement amount of any of the particles constituting the contact candidate particle pairs is equal to or more than a predetermined integrated displacement amount, or specifically a displacement of ¼ cell or more. "The integrated displacement which is equal to or more than a predetermined integrated displacement amount" is defined with respect to an amount of displacement that substantially eliminates likelihood that a new particle comes into contact with the focused particle. More specifically, the diameter of a particle and the size of one side constituting the contour of one cell are taken into consideration. Then, it is studied how much a particle is displaced to come into contact with another particle to constitute a contact candidate particle pair. Then, the predetermined integrated displacement amount is defined. Each cell needs to include a largest particle. Accordingly, one side of the cell should be slightly larger than the diameter of the largest particle. In this embodiment, for example, it is assumed that a ratio between a particle diameter r and a size L of one side constituting the contour of one cell is in a relationship of 1 to 1.01. This ratio is used in this embodiment alone, and the present invention is not limited to the relationship of this ratio.

Then, when the cell has the shape of a two-dimensional square, this one side is defined as a side of the square. When the cell has the shape of a regular hexahedron, this one side is defined as a side of the regular hexahedron. When the assumption as described above is made, it is preferable that an amount which is equal to or more than the "predetermined amount" is defined to be "¼ cell or more".

In this embodiment, when the displacement of ¼ cell or more is determined in step ST11, of displacement amount determination, the process proceeds to step ST12 of contact candidate particle pair data updating. When the displacement of ¼ cell or more is not determined in the displacement amount determination step, the process proceeds to step ST13, and a repetition step (constituted by steps ST4 to ST11 and step ST13) of repeating the physical quantity computation step and the coordinate data updating step (step ST9), step ST10, and step ST11 of displacement amount determination at predetermined time intervals are executed by the computer. The predetermined time intervals are updated in step ST13. As described later in detail, when the predetermined integrated displacement amount of the particle of the contact candidate particle pair is less than ¼ cell, it is assumed that there is substantially no likelihood that the particles of the contact candidate particle pair newly comes into contact with each other. Accordingly, when there is substantially no likelihood that the particles of the contact candidate particle pair newly comes into contact with each other, physical quantity computation is continuously performed on the contact candidate particle pairs that have been determined before the displacement amount determination step. Even if the number of updating the contact candidate particle pairs is reduced as described above, computation accuracy will not be reduced.

When it is determined in step ST11 that the integrated displacement amount has become ¼ cell or more, there will be a high possibility that the particles of the contact candidate pair, which were not in contact with each other in an immediately preceding step, would come into contact with each other. Then, when a situation as described above has occurred, cell data and pair data on the contact candidate particle pairs are updated in step ST12. Specifically, the process returns to step ST2 of mapping, and the pair data on the contact candidate particle pairs are updated. When updating timing for the contact particle pairs is set as described above, the pair data on the contact candidate particle pairs will be updated when a likelihood become high that the particles of the contact candidate particle pair will come into contact with each other. Accordingly, accuracy of the simulation will not be reduced even if the contact determination is partly omitted to increase the computing speed.

FIG. 2 is a flowchart showing details of the algorithm for routines of the program for executing the mapping step and the contact candidate determination step at the time of updating. When the pair data on the contact candidate particle pairs are updated in this algorithm, a speed of rewriting the memories can be increased as follows. When the displacement of ¼ cell or more is determined in the displacement amount determination step described before, the mapping step and the contact candidate determination step are executed again. Then, the subsequent contact candidate particle pair data updating step is executed. In the contact candidate particle pair data updating step, data relating to a contact candidate particle pair that was formerly the contact candidate particle pair but is no longer the contact candidate particle pair after the updating is deleted from the contact candidate particle pair data memory. Then, data relating to a contact candidate particle pair that was not formerly the contact candidate particle pair, but has newly become the contact candidate particle pair after the updating is added to the contact candidate particle pair data memory. Data relating the remaining contact candidate particle pairs are retained in the memory without alteration. With this arrangement, the pair data can be updated just by deletion and addition of the data. Consequently, rewriting the data is facilitated, and the computing speed is also increased. In this embodiment, the contact candidate particle pair data memory M3 stores the data in a link list structure in which data on each contact candidate particle pair have a reference to data on a subsequent contact candidate particle pair.

In the contact candidate particle pair data updating step, the contact candidate particle pair to be deleted and the contact candidate particle pair to be added will be determined specifically as follows, for example. In step ST21, particle-cell mapping is executed based on the updated coordinate data. This step ST21 is the same as step 2 in FIG. 1. In the cell mapping in step ST21, a designation is assigned to a cell where a particle is present. In this embodiment, the name or number of "Cik" is given to each cell for convenience. More specifically, i indicates the name of the focused particle, while k indicates the address of the cell where the particle i is present. The address in the k direction of the cell to which the particle i belongs is ±p and ±q in the two-dimensional arrangement, and ±p, ±q, and ±r in the three-dimensional arrangement. Herein, the address of the reference cell is set to (0, 0), and the address of the other cell is expressed in (±p, ±q).

Figure 4:
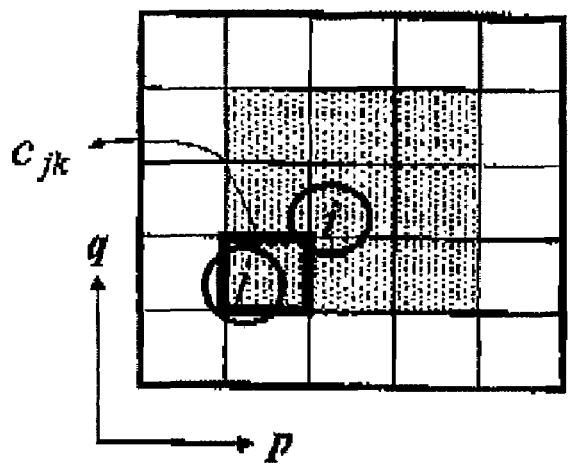
FIG. 4 is an explanatory illustration showing neighboring cells of a cell in which a focused particle is located.

When the cells are three-dimensionally arranged, the address of the reference cell is set to (0, 0, 0), and the address of the other cell is expressed in (±p, ±q, ±r), where p, q, and r are integers indicating a number in the arrangement order in which the other cell is located with respect to the reference cell in the plus or minus direction of each dimension (the first, second and third dimensions in this order). Hereinafter, the address of each cell is two-dimensionally expressed, for convenience. Cells, which are located by ±1 apart from the cell where the particle i is present in the ±p and ±q directions, are defined as neighboring cells for the particle i (those cells are hatched portions in FIG. 4) as shown in FIG. 4. In this case, a particle that is present in any of the neighboring cells is defined to be a neighboring particle j for the particle i. Then, the designation of the cell to which the particle j belongs is indicated by Cjk.

In this embodiment, updating timing for the contact candidate particle pairs described before is determined as follows. Around the particle i after a plurality of computation steps of steps ST 4 through ST13 in FIG. 1 are repeated n times (wherein n is a positive integer), the following three situations may be assumed.

1. The particle i and the particle j are continuously located in the neighborhood (the particles i and j remains as a contact candidate particle pair).

2. The particle i and the particle j are moved apart from each other, and are no longer located in the neighborhood (the contact candidate particle pair is decomposed or cancelled).

3. The particle j that was not located in the neighborhood of the particle i before the n times of the computation steps has approached the particle i and comes into a neighboring cell for the particle i, and the particles i and j newly constitute a contact candidate particle pair (a new contact candidate particle pair is generated).

The first situation (1) can be found when the contact candidate particle pair data before the n times of the computation steps are continuously retained and used.

The second situation (2) can also be found among the contact candidate particle pair data before the n times of computation steps are performed. In this situation, when it is confirmed that the particle i and the particle j are no longer located in the neighborhood, data relating only to the contact candidate particle pair of the particle i and the particle j should be deleted from the memory.

The third situation (3) cannot be found among the contact candidate particle pair data before the n times of the computation steps are performed. Accordingly, updating of the contact candidate particle pairs is necessary when this situation occurs. Conversely, unless the third situation has occurred on any of the focused particles, it is not necessary to update the contact candidate particle pair data. Accordingly, the updating timing for the contact candidate particle pairs should be defined to be the time that the third situation occurs. However, the third situation cannot be found among the contact candidate particle pairs before the updating. Thus, the timing must be determined according to a criterion other than the neighborhood relationship before the updating. Then, in the algorithm of the program shown in FIG. 2, the "timing at which the third situation occurs" is replaced by "timing at which the third situation would occur", and the criterion for updating the contact candidate particle pairs is therefore determined.

Figure 5:
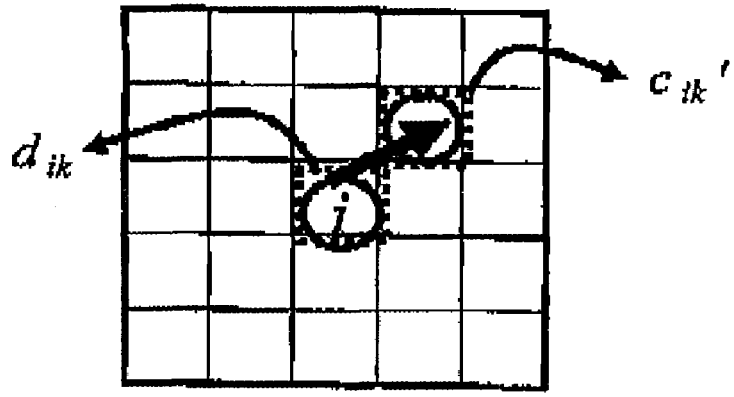
FIG. 5 is an illustration showing a change in designation of the cell after the focused particle has moved.

When the particle i that was present in the cell Cik at a certain time t has moved as shown in FIG. 5 during Δt seconds, a cell into which the particle i has moved is indicated by Cik'. Then, when a movement quantity vector of the cell associated with the movement of the particle i is indicated by dik, the movement quantity vector dik is given as follows:

$$dik = Cik' - Cik$$

Figure 6:
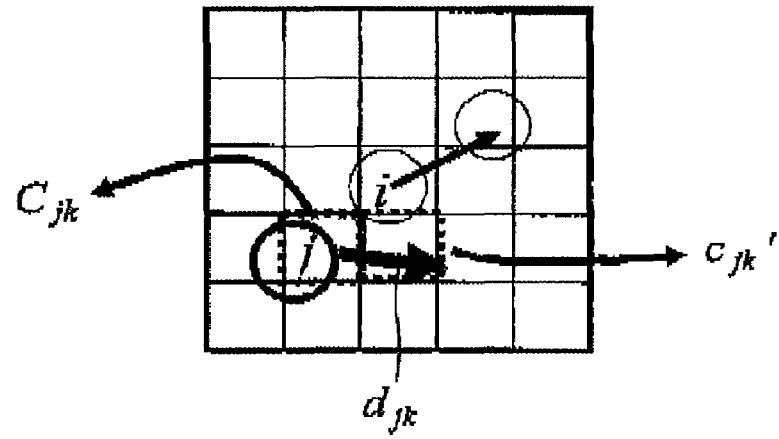
FIG. 6 is an explanatory illustration showing a relationship between the focused particle and a neighboring particle.

Movement of the neighboring particle j for the particle i during the Δt seconds is also considered in the same manner, and a cell into which the particle j has moved as shown in FIG. 6 is indicated by Cjk'. When a movement quantity vector of the cell associated with the movement of the particle j is indicated by djk, as in the foregoing description, the movement quantity vector djk is given as follows:

$$djk = Cjk' - Cjk$$

Figure 7:
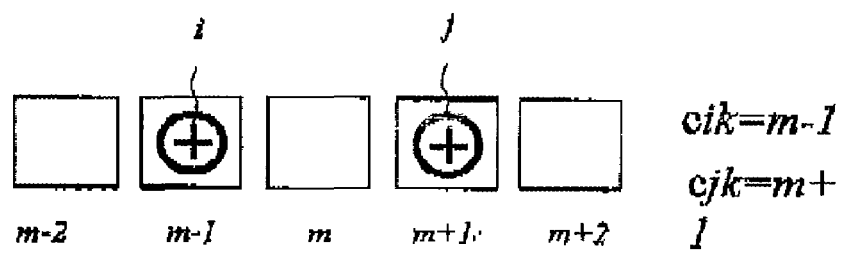
FIG. 7 is an explanatory illustration showing a precondition in which a contact candidate particle pair is constituted by two particles.
Figure 8A:
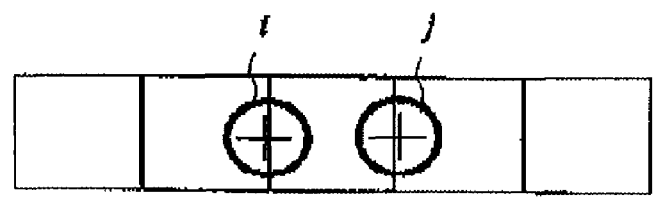
FIGS. 8A and 8B respectively show an example of locations of the particles within cells.
Figure 8B:
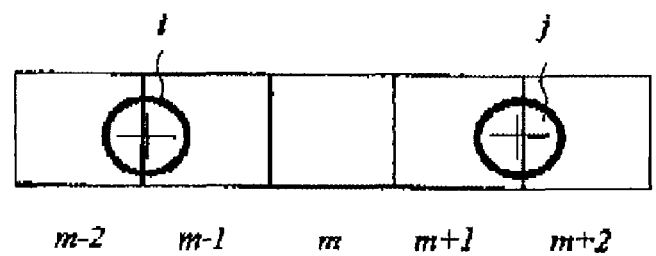

Herein, an integer is selected as a value of n so that respective movement quantities of all the particles in the ±p and ±q directions during n times of computation steps may be less than a half of the cell width. The reason for this is as follows. Assuming that the addresses of cells in which the particles i and j are present in the certain k direction (such as the p direction) are indicated by Cik=m−1 and Cjk=m+1, respectively. Then, when the particles i and j are in a positional relationship as shown in FIG. 7, the particles i and j do not constitute the contact candidate particle pair. The particles i and j located within the cell Cik=m−1 and the cell Cik=m+1, respectively may be in any of the situations shown in FIG. 7 and FIGS. 8A and 8B. Apparently, the particles i and j in FIG. 8A are almost in a state of the contact candidate particle pair, compared with the situation shown in FIG. 5B. Nevertheless, it cannot be said that the particles i and j in FIG. 8A are the contact candidate particle pair.

The contact candidate particle pairs include pairs of particles actually in contact with each other and pairs of particles that are in almost contact with each other. As a necessary condition for this situation, a pair of particles which come into contact with each other must always be included in the contact candidate particle pairs. Conversely, there should be no pairs of particles which are actually in contact with each other but are not included in the contact candidate particle pairs. Accordingly, in order to determining the updating timing for the contact candidate particle pairs, no new contacts must not occur until the contact candidate particle pairs are updated.

As described before, the particles i and j even in the state shown in FIG. 8A are not the contact candidate particle pair. When the particles i and j move toward each other and travel by a distance larger than the half of the cell width, the particles i and j are brought into contact with each other via a shortest route. Accordingly, a condition that two particles, which are not a contact candidate particle pair but are almost in a state of the contact candidate particle pair, do not to come into contact with each other is that the respective movement quantities or the respective displacement amounts of the particles are less than the half of the cell width. Then, in this embodiment, the updating timing for the contact candidate particle pairs are defined as follows:

The cell width is larger than the diameter of the largest particle assumed.

Components of the movement quantities of all the particles in the k direction (such as the p and q directions in the two-dimensional arrangement or the p, q, and r directions in the three-dimensional arrangement) are checked. When the maximum absolute value of each component becomes more than ¼ of the cell width, the contact candidate particle pairs are updated.

When the updating timing for the contact candidate particle pairs has occurred, and then the cell mapping in step ST21 described before is performed again, it is checked in steps ST22, 23 and 25 whether or not absolute values of numeric differences between the addresses of two cells where two particles, which formerly constituted a contact candidate particle pair, are located are more than 1 (one) In step ST22, comparison is made between data on the cells Cik' and Cjk that have been updated with respect to the contact candidate particle pair (i, j) used before the last updating. Then, in step ST23, the following operations are performed.

Figure 9:
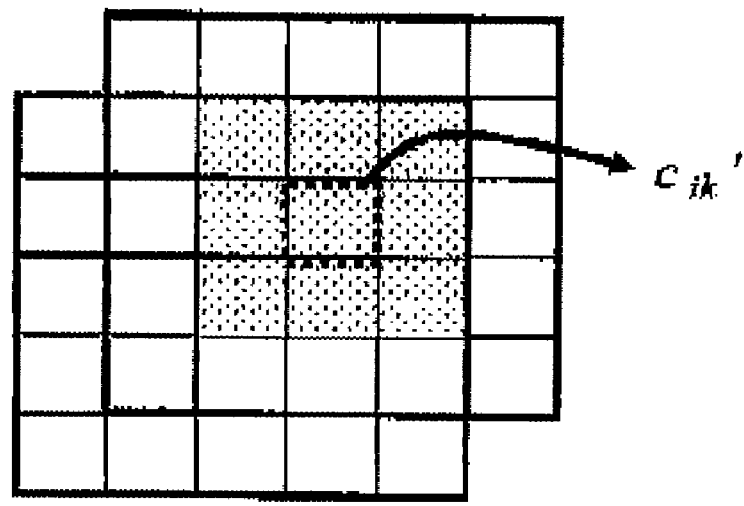
FIG. 9 is an explanatory illustration showing that a range of cells adjacent to the reference cell also moves when the focused particle moves to a different cell.

When |Cik'−Cjk'|<=1 (one) (equal to or less than one) at time of T=t+Δt, it can be known that the particles i and j are located in the neighborhood. It means that the particle j is present in a range of cells adjacent to the cell Cik' (or a hatched cell region) after the displacement, as shown in FIG. 9. On the other hand, when |Cik'−Cjk'|>1 (one) (more than one), the particles i and j are not located in the neighborhood. It means that the particle j is not present in the range of the cells adjacent to the cell Cik' (or the hatched cell region) after the displacement, as shown in FIG. 9.

In respect of the pairs of the particles i and j which were in the neighborhood at time of t and are also located in the neighborhood at time of T=t+Δt, the same contact candidate particle pair data can be continuously used as "continuously usable contact candidate data". In respect of the pairs of the particles i and j which were not in the neighborhood at time of t but are located in the neighborhood at time of T=t+Δt, such pairs need to be registered as "new contact candidate particle pair data". Conversely, in respect of the pair of the particles that were the contact candidate particle pairs at time of T=t but are no longer the contact candidate particle pair at time of T=t+Δt, the contact candidate particle pair data relating to such pairs need to be deleted. It is herein referred to as "cancellation of the contact candidate particle pair data".

Figure 10:
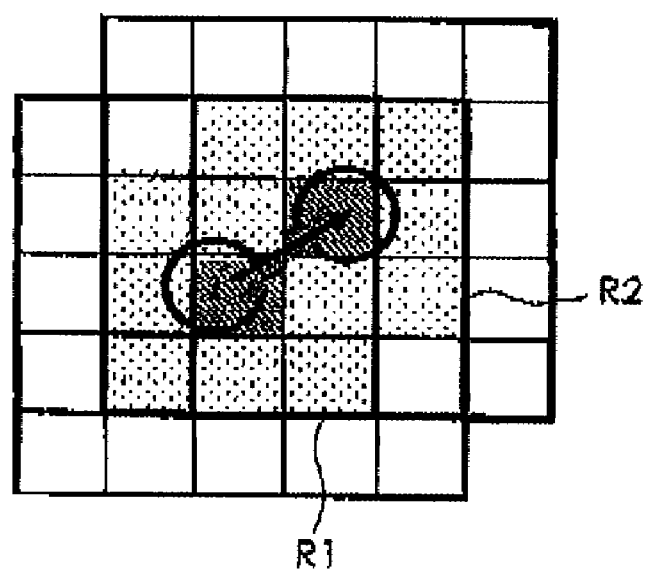
FIG. 10 is an explanatory illustration showing a situation where the focused particle has moved.

As shown in FIG. 10, with the movement of the particle i, the neighboring cells for the particle i also move. In this case, when the particle i moves to a cell located at the upper right, for example, a region R1 around the particle i will also move to a region R2.

Figure 11:
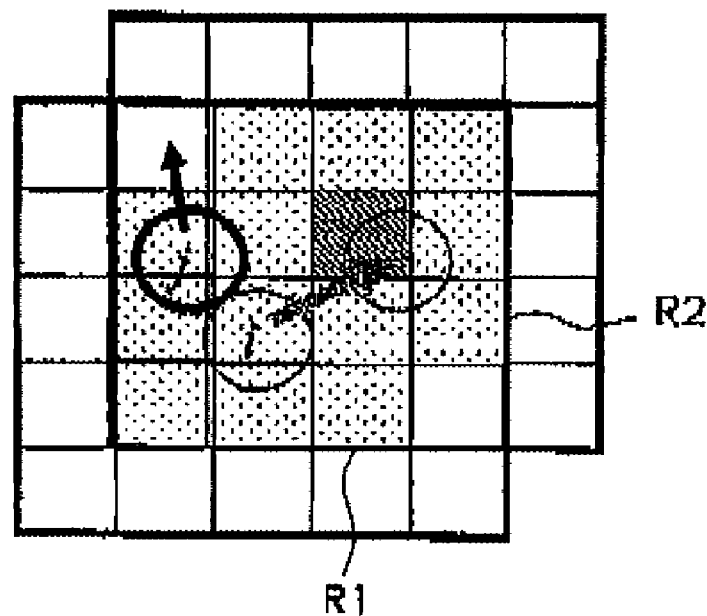
FIG. 11 is an explanatory illustration showing a situation where a neighboring particle comes apart from the focused particle, and does no longer constitute the contact candidate particle pair.

When the neighboring particle j originally located within a neighboring cell for the particle i (within the region R1) is not present within a new neighboring cell for the particle i (within the region R2) after the particle i has moved, as shown in FIG. 11, the relationship of the contact candidate particle pair between the particle i and the particle j is cancelled. This situation holds when |Cik−Cjk|<=1 (one) (equal to or less than one) and |Cik'−Cjk'|>1 (one) (more than one). The data on the pair of the particle i and the particle j are completely deleted from the memory, in step ST27.

When checking on all the contact candidate particle pairs is completed, the process proceeds to step ST28. In step ST28 and in steps ST29 through ST37 in FIG. 2, new pair data are prepared for the contact candidate particle pairs obtained after the checking, and old data are replaced by the new cell data. In step ST28, the contact candidate particle pair (i, j) that is located in the neighborhood is extracted from the updated cell data. Then, in step ST29, comparison is made on the cell data on the contact candidate particle pair (i, j) before the updating. More specifically, in respect of the particles of the updated contact candidate particle pair, the relationship before the updating is checked. By making this comparison, it is determined in steps ST30 to ST32 that the current contact candidate particle pair was in the relationship of contact candidate before the updating as well. Alternatively, it is determined in steps ST34 to ST36 that the current contact candidate particle pair has newly got into the relationship of contact candidate after the updating.

Figure 12:
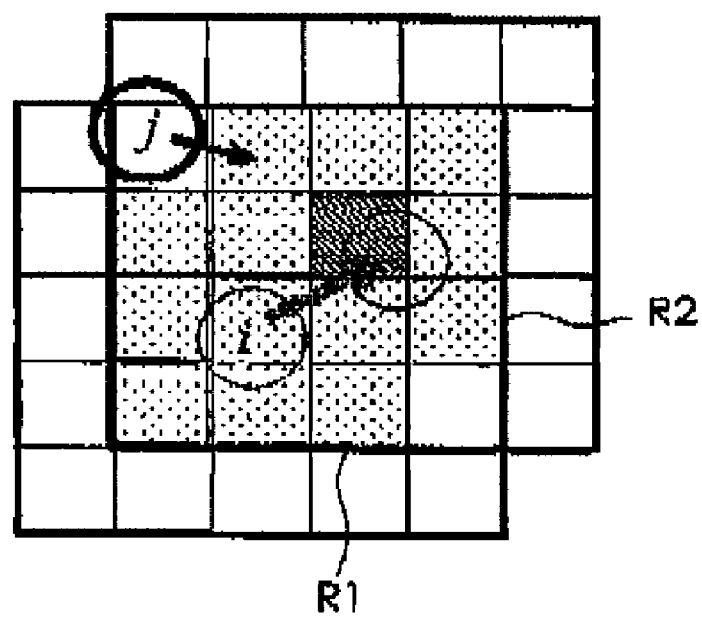
FIG. 12 is an explanatory illustration showing a situation where a particle which was not a neighboring particle to the focused particle becomes the neighboring particle.

When the particle j that was originally located outside the neighboring cells for the particle i (outside the region R1) enters into a new neighboring cell for the particle i (within the region R2) after the particle i has moved, as shown in FIG. 12, the relationship as the contact candidate particle pair is newly generated between the particle i and the particle j. This relationship holds when |Cik−Cjk|>1 (one) (more than one) and |Cik'−Cjk'|<=1 (one) (equal to or less than one) in steps ST34 and ST35. Then, the data on the pair of the particle i and the particle j are newly created on the memory in step ST36.

Figure 13:
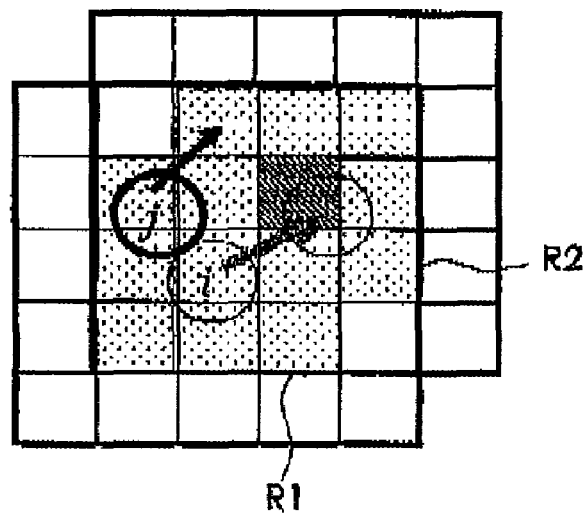
FIG. 13 is an explanatory illustration showing a situation where a particle which was formerly the neighboring particle becomes the neighboring particle again even after the focused particle has moved.

When the neighboring particle j that was originally present in a neighboring cell (within the region R1) for the particle i is present within a new neighboring cell (within the region R2) even after the particle i has moved as shown in FIG. 13, the relationship as the contact candidate particle pair is maintained between the particle i and the particle j.

This relationship holds when |Cik'−Cjk|<=1 (one) (equal to or less than one) and |Cik'−Cjk'|<=1 (one) (equal to or less than one) in steps ST30 and ST31. Then, the data on the pair of the particle i and the particle j are continuously used without alteration in step ST32.

In summary, it is first checked whether or not absolute values of numeric differences between the addresses of two cells for two particles that formerly constituted a contact candidate particle pair are more than 1 (one), and then it is checked whether or not the two particles are contact candidates. When a cell address is two-dimensionally expressed and when the particle i and the particle j formerly constituted the contact candidate particle pair, absolute values of |pi−pj| and |qi−qj| for numeric differences between the cell address (pi, qi) for the particle i and the cell address (pj, qj) for the particle j are computed. Then, when both of the absolute values are more than 1 (one), the particles are determined to be the particle pair that is no longer the contact candidate particle pair. When the particle i and the particle j are the contact candidate particle pair newly determined in the contact candidate determination step, it is checked whether or not the absolute values of |pi−pj| and |qi−qj| for numeric differences between the cell addresses (pi, qi) and (pj, qj) for the two cells where the two particles were formerly located are more than 1 (one). Then, when both of the absolute values are more than one, the particles are determined to be the contact candidate particle pair that has newly become the contact candidate particle pair after the updating.

Figure 14:
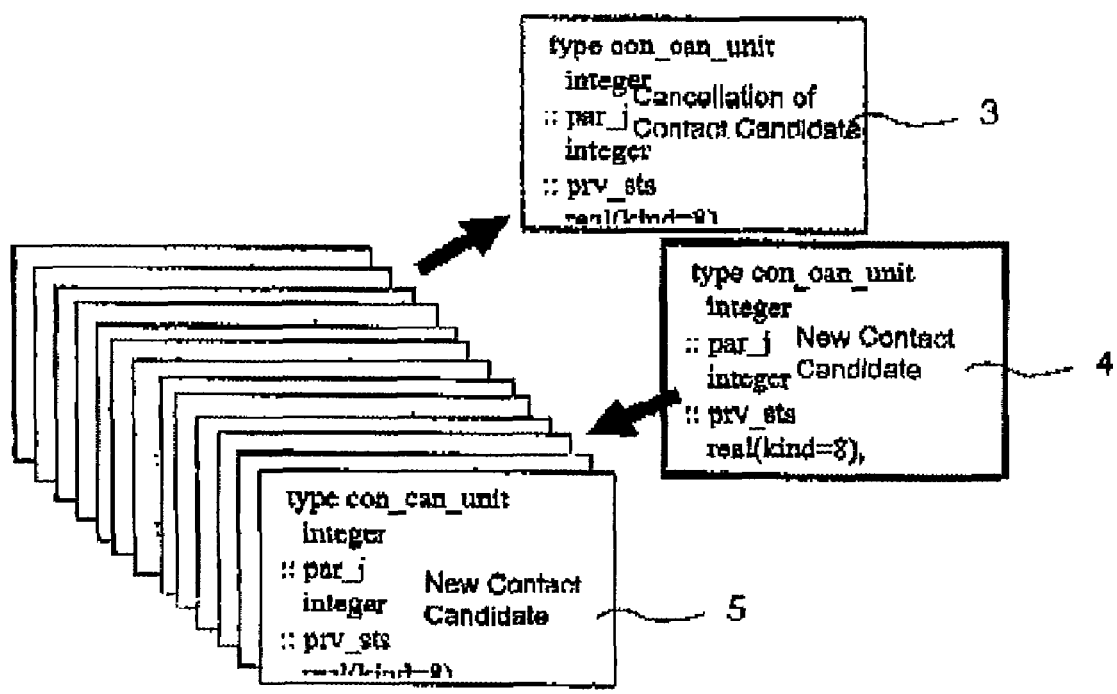
FIG. 14 is a conceptual illustration showing that data are stored in a link list structure.

An amount of the data becomes very huge if the contact candidate particle pair data contain information on whether or not the particles of each pair are in contact with each other and when they come into contact with each other or they become no longer the pair and such information relating to all the contact candidate particle pairs is stored in the memory. When the contact candidate particle pairs are updated, it is accordingly determined on all the contact candidate particle pairs whether or not the particles of each pair still constitute the pair (continued pair), or are no longer the pair (cancelled pair), or newly become the pair (new pair). For this reason, this embodiment employs a link list structure to store the data on the contact candidate particle pairs, as shown in FIG. 14. In this link list structure, the data on each contact candidate particle pair have a reference to the data on a subsequent contact candidate particle pair. Thus, addition and deletion of the data is facilitated. In this method, it is imagined that the data on each contact candidate particle pair are indicated on a card. Then, Each card is formatted in the link list structure in which the data on each contact candidate particle pair have a reference to the subsequent contact candidate particle pair. When canceling or decomposing the contact candidate particle pair described above, it is imagined that the card with the data indicated thereon the contact candidate particle pair to be cancelled or decomposed is removed (or deleted). In respect of the newly generated contact candidate particle pair described above, the card with the data on the newly generated contact candidate particle pair indicated thereon is prepared and added to the link list structure. Further, the card of the data on the continued contact candidate particle pair is retained without alternation. When the data is stored in the link list structure as described above, data handling time can be reduced, and the total time of computation can be therefore greatly reduced.

Checking in steps ST28 through ST33 is performed on all the contact candidate particle pairs. Then, when the checking on all the contact candidate particle pairs has been completed, the cell data are replaced in step ST37.

The foregoing description was directed to the method of updating the contact candidate particle pairs used in this embodiment. The cell information (address) Cik on each particle is stored in the cell data memory in order to compute:

$$dik = Cik' - Cik \text{ and}$$

$$djk = Cjk' - Cjk$$

Thus, the contact candidate particle pairs can be very readily updated.

In the method used in this embodiment, contact determination itself is not decimated, but the contact candidate particle pair updating is rationally decimated, and the contact candidate data is efficiently handled. Computation time required for the contact determination and the memory to be used are thereby saved. Accordingly, in the program of the present invention, by rationally determining the updating timing for the contact candidate particle pairs, accuracy of computation can be maintained. Further, by decimating the contact candidate particle pair updating, considerable reduction of the computation time becomes possible.

In the embodiment described above, the descriptions are directed to the updating of the contact candidate particle pairs in the two-dimensional arrangement. Substantially the same descriptions can be applied to the updating in the three-dimensional arrangement.

Figure 15:
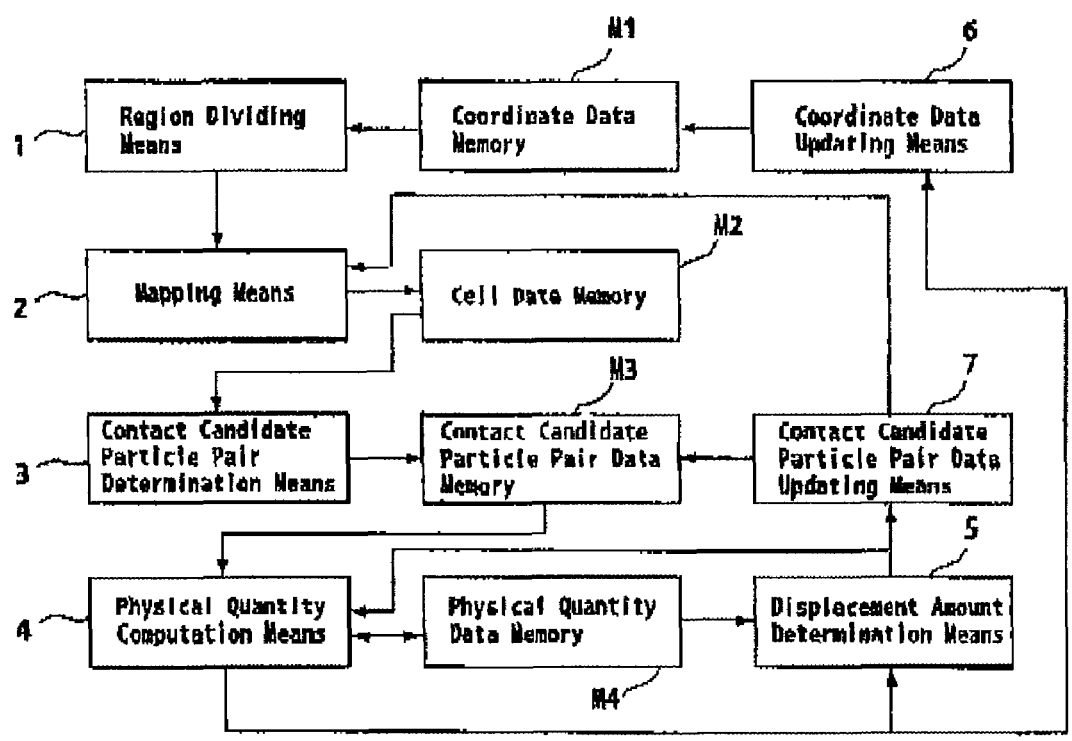
FIG. 15 is a block diagram showing a configuration of a particle data computing apparatus of the present invention that computes particle data used in simulation which is carried out in a computer, based on DEM (discrete element method).

FIG. 15 is a block diagram showing a configuration of a particle data computing apparatus that computes particle data used in simulation which is carried out in a computer based on the DEM (Discrete Element Method). This apparatus comprises region dividing means 1, mapping means 2, contact candidate particle pair determination means 3, physical quantity computation means 4, coordinate data updating means 6, displacement amount determination means 5, contact candidate particle pair data updating means 7, the coordinate data memory M1, the cell data memory M2, the contact candidate particle pair data memory M3, and the physical quantity memory M4. The region dividing means 1 divides a region including a plurality of particles identified by coordinate data stored in the coordinate data memory M1 into a plurality of cells. The mapping means 2 assigns an address to each of the cells so that when one of the cells obtained by the region dividing means 1 is used as a reference cell, it can be known how many cells other cells are located apart from the reference cell in the two-dimensional direction or the three-dimensional direction. The mapping means 2 also identifies a plurality of the cells where centers of the particles are located respectively, based on the coordinate data for the particles. Then, the mapping means 2 stores in the cell data memory M2 data that identify the cells where the centers of the particles are located respectively.

When the center of other particle is located within a cell adjacent to the cell where a focused particle is located, the contact candidate particle pair determination means 3 determines the focused particle and the other particle to constitute a contact candidate particle pair, based on the addresses respectively assigned to the cells. The contact candidate particle pair determination means 3 performs the determination described above on each of the particles within the cells. The contact candidate particle pair data memory M3 stores data relating to contact candidate particle pairs determined by the contact candidate particle pair determination means 3. The physical quantity computation means 4 determines whether or not the particles of each contact candidate particle pair are in contact with each other. Then, the physical quantity computation means 4 computes physical quantities with respect to motions of the focused particle, the other particle in contact with the focused particle, and the other particle that is highly likely to come into contact with the focused particle, based on a location of the focused particle after a unit time has elapsed. The physical quantity data memory stores results of computations by the physical quantity computation means 4.

The coordinate data updating means 6 updates the coordinate data on a plurality of the particles based on the results of computations by the physical quantity computation means 4. The displacement amount determination means 5 determines whether or not an integrated displacement amount of any of the particles constituting the contact candidate particle pairs is equal to or more than ¼ cell, based on the results of computations by the physical quantity computation means 4. Then, when the displacement amount determination means 5 determines that the integrated displacement amount is equal to or more than ¼ cell, the mapping means 2 and the contact candidate particle pair determination means 3 are re-executed, thereby performing updating again. Specifically, the data on the contact candidate particle pair that was formerly the contact candidate particle pair but is no longer the contact candidate particle pair are deleted from the contact candidate particle pair data memory M3. Alternatively, data on the contact candidate particle pair that was not formerly the contact candidate particle pair but has newly become the contact candidate particle pair after the updating are added to the contact candidate particle pair data memory M3. Then, data relating the remaining contact candidate particle pairs are retained in the memory without alteration. When the displacement amount determination means 5 does not determine that the integrated displacement amount is equal to or more than ¼ cell, the physical quantity computation means 4, coordinate data updating means 6, and displacement amount determination means 5 are executed e at predetermined time intervals, recurrently.

When a main portion of the apparatus described above is implemented or realized in the computer, the program including the algorithms shown in FIGS. 1 and 2 may be executed by the computer. In that case, the region dividing means 1 is implemented by step ST1 in FIG. 1. The mapping means 2 is implemented by step ST2 in FIG. 1. The contact candidate particle pair determination means 3 is implemented by step ST3 in FIG. 1. The physical quantity computation means 4 is implemented by steps ST4 to ST10 in FIG. 1. The coordinate data updating means 6 is implemented by step ST9. The displacement amount determination means 5 is implemented by step ST11. The contact candidate particle pair data updating means 7 is implemented by step ST12.

Further, the present invention is not limited to these embodiments, but various variations and modifications may be made without departing from the scope of the present invention.

What is claimed is:

1. A computer-readable storage medium including a particle data computing program for computing particle data used in simulation which is carried out in a computer, based on a discrete element method (DEM), the particle data computing program causing the computer to execute:

a region dividing step of dividing a region including a plurality of particles identified by coordinate data into a plurality of cells;

a mapping step of assigning an address to each of the cells obtained at the region dividing step so that, when one of the cells is used as a reference cell, it can be known how many cells other cells are located apart from the reference cell in a two-dimensional direction or a three-dimensional direction, identifying, based on the coordinate data for the particles, a cell in which a center of each of the particles is located, and storing in a cell data memory data which identify the plurality of cells where the centers of the particles are located respectively;

a contact candidate particle pair determination step of focusing attention on one of the particles as a focused particle, and determining, based on the address of each of the cells, that the focused particle and each of other particles, of which the centers are located in adjacent cells to the cell where the focused particle is located, constitute a contact candidate particle pair; the contact candidate particle pair determination step being carried out on each of the particles in each of the cells;

a contact candidate particle pair storing step of storing in a contact candidate particle pair data memory data relating to the contact candidate particle pair determined in the contact candidate particle pair determination step;

a physical quantity computation step of determining whether or not the particles of the contact candidate particle pair are in contact with each other, and computing physical quantities relating to motions of the focused particle, the other particle in contact with the focused particle, and the other particle very likely to come into contact with the focused particle, based on a location of the focused particle after a unit time has elapsed;

a coordinate data updating step of updating the coordinate data for the particles, based on results of computations in the physical quantity computation step;

a displacement amount determination step of determining, based on the results of computations in the physical quantity computation step, whether or not an integrated displacement amount of any of the particles constituting the contact candidate particle pairs is equal to or more than a predetermined integrated displacement amount;

a contact candidate particle pair data updating step of returning to the mapping step and executing each of the subsequent steps when the integrated displacement amount of any of the particles is determined to be equal to or more than the predetermined integrated displacement amount in the displacement amount determination step; and a repetition step of repeating the physical quantity computation step, the coordinate data updating step, and the displacement amount determination step at predetermined time intervals when the integrated displacement amount of any of the particles constituting the contact candidate particle pairs is not determined to be equal to or more than the predetermined integrated displacement amount in the displacement amount determination step.

2. The computer-readable storage medium including a particle data computing program according to claim 1, wherein
in the mapping step, when the plurality of cells are two-dimensionally arranged, the address of the reference cell is set to (0, 0) and the address of other cell is expressed in ($\pm p$, $\pm q$), and when the plurality of cells are three-dimensionally arranged, the address of the reference cell is set to (0, 0, 0) and the address of the other cell is expressed in ($\pm p$, $\pm q$, $\pm r$), where p, q, and r are integers indicating a number in the arrangement order in which the other cell is located with respect to the reference cell in a plus direction or a minus direction of the respective dimensions; and in the contact candidate particle pair determination step, when the other particle is located in a cell for which absolute values of numeric differences between the address of the reference cell where the focused particle is located and the address of the other cell where the other particle is located are 1 (one) or less, the focused particle and the other particle are determined to be the contact candidate particle pair.

3. The computer-readable storage medium including a particle data computing program according to claim 1, wherein
in the mapping step, when the plurality of cells are two-dimensionally arranged, the address of the reference cell is set to (0, 0) and the address of other cell is expressed in ($\pm p$, $\pm q$), and when the plurality of cells are three-dimensionally arranged, the address of the reference cell is set to (0, 0, 0) and the address of the other cell is expressed in ($\pm p$, $\pm q$, $\pm r$), where p, q, and r are integers indicating a number in the arrangement order in which the other cell is located with respect to the reference cell in a plus direction or a minus direction of the respective dimensions;

in the contact candidate particle pair determination step, when the other particle is located in a cell for which absolute values of numeric differences between the address of the reference cell where the focused particle is located and the address of the other cell where the other particle is located are 1 (one) or less, the focused particle and the other particle are determined to be the contact candidate particle pair; and in the contact candidate particle pair data updating step, it is checked whether or not absolute values of numeric differences between the addresses of two of the cells where two particles formerly constituting the contact candidate particle pair are located respectively are more than 1 (one), and it is determined that the two particles are no longer the contact candidate particle pair when the absolute values are more than 1 (one); and in respect of the contact candidate particle pair newly determined as a contact candidate particle pair in the contact candidate particle pair determination step, it is checked whether or not absolute values of numeric differences between the addresses of two of the cells where two particles newly determined as a contact candidate particle pair were formerly located respectively are more than 1 (one), and it is determined that the two particles are a contact candidate particle pair which has newly become the contact candidate particle pair after the updating.

4. A computer-readable storage medium including a particle data computing program for computing particle data used in simulation which is carried out in a computer, based on a discrete element method (DEM), the particle data computing program causing the computer to execute:

a region dividing step of dividing a region including a plurality of particles identified by coordinate data into a plurality of cells;

a mapping step of assigning an address to each of the cells obtained at the region dividing step so that, when one of the cells is used as a reference cell, it can be known how many cells other cells are located apart from the reference cell in a two-dimensional direction or a three-dimensional direction, identifying, based on the coordinate data for the particles, a cell in which a center of each of the particles is located, and storing in a cell data memory data which identify the plurality of cells where the centers of the particles are located respectively;

a contact candidate particle pair determination step of focusing attention on one of the particles as a focused particle, and determining, based on the address of each of the cells, that the focused particle and each of other particles, of which the centers are located in adjacent cells to the cell where the focused particle is located, constitute a contact candidate particle pair; the contact candidate particle pair determination step being carried out on each of the particles in each of the cells;

a contact candidate particle pair storing step of storing in a contact candidate particle pair data memory data relating to the contact candidate particle pair determined in the contact candidate particle pair determination step;

a physical quantity computation step of determining whether or not the particles of the contact candidate particle pair are in contact with each other, and computing physical quantities relating to motions of the focused particle, the other particle in contact with the focused particle, and the other particle very likely to come into contact with the focused particle, based on a location of the focused particle after a unit time has elapsed;

a coordinate data updating step of updating the coordinate data for the particles, based on results of computations in the physical quantity computation step;

a displacement amount determination step of determining, based on the results of computations in the physical quantity computation step, whether or not an integrated displacement amount of any of the particles constituting the contact candidate particle pairs is equal to or more than ¼ (one-quarter) of the cell;

a contact candidate particle pair data updating step of re-executing the mapping step and the contact candidate particle pair determination step for updating, and then deleting from the contact candidate particle pair data memory data relating to the contact candidate particle pair which was formerly the contact candidate particle pair before the updating but is no longer the contact candidate particle pair after the updating, adding to the contact candidate particle pair data memory data relating to the contact candidate particle pair which was formerly not the contact candidate particle pair before the updating but newly becomes the contact candidate particle pair after the updating, and retaining without alternation in the contact candidate particle pair data memory data relating to the remaining contact candidate particle pairs which are still the contact candidate particle pairs after the updating; and a repetition step of repeating the physical quantity computation step, the coordinate data updating step, and the displacement amount determination step at predetermined time intervals when the integrated displacement amount of any of the particles constituting the contact candidate particle pairs is not determined to be equal to or more than ¼ (one-quarter) of the cell in the displacement amount determination step.

5. The computer-readable storage medium including a particle data computing program according to claim 4, wherein
in the mapping step, when the plurality of cells are two-dimensionally arranged, the address of the reference cell is set to (0, 0) and the address of other cell is expressed in ($\pm p$, $\pm q$), and when the plurality of cells are three-dimensionally arranged, the address of the reference cell is set to (0, 0, 0) and the address of the other cell is expressed in ($\pm p$, $\pm q$, $\pm r$), where p, q, and r are integers indicating a number in the arrangement order in which the other cell is located with respect to the reference cell in a plus direction or a minus direction of the respective dimensions; and in the contact candidate particle pair determination step, when the other particle is located in a cell for which absolute values of numeric differences between the address of the reference cell where the focused particle is located and the address of the other cell where the other particle is located are 1 (one) or less, the focused particle and the other particle are determined to be the contact candidate particle pair.

6. The computer-readable storage medium including a particle data computing program according to claim 4, wherein
in the mapping step, when the plurality of cells are two-dimensionally arranged, the address of the reference cell is set to (0, 0) and the address of other cell is expressed in ($\pm p$, $\pm q$), and when the plurality of cells are three-dimensionally arranged, the address of the reference cell is set to (0, 0, 0) and the address of the other cell is expressed in ($\pm p$, $\pm q$, $\pm r$), where p, q, and r are integers indicating a number in the arrangement order in which the other cell is located with respect to the reference cell in a plus direction or a minus direction of the respective dimensions;

in the contact candidate particle pair determination step, when the other particle is located in a cell for which absolute values of numeric differences between the address of the reference cell where the focused particle is located and the address of the other cell where the other particle is located are 1 (one) or less, the focused particle and the other particle are determined to be the contact candidate particle pair; and in the contact candidate particle pair data updating step, it is checked whether or not absolute values of numeric differences between the addresses of two of the cells where two particles formerly constituting the contact candidate particle pair are located respectively are more than 1 (one), and it is determined that the two particles are no longer the contact candidate particle pair when the absolute values are more than 1 (one); and in respect of the contact candidate particle pair newly determined as a contact candidate particle pair in the contact candidate particle pair determination step, it is checked whether or not absolute values of numeric differences between the addresses of two of the cells where two particles newly determined as a contact candidate particle pair were formerly located respectively are more than 1 (one), and it is determined that the two particles are a contact candidate particle pair which has newly become the contact candidate particle pair after the updating.

7. The computer-readable storage medium including a particle data computing program according to claim 4, wherein the contact candidate particle pair data memory stores data in a link list structure, where data relating to each of the contact candidate particle pairs have a reference to subsequent data relating to a subsequent contact candidate particle pair.

8. A particle data computing method of computing particle data used in simulation which is carried out in a computer, based on a discrete element method (DEM), the method comprising:
a region dividing step of dividing a region including a plurality of particles identified by coordinate data into a plurality of cells;
a mapping step of assigning an address to each of the cells obtained at the region dividing step so that, when one of the cells is used as a reference cell, it can be known how many cells other cells are located apart from the reference cell in a two-dimensional direction or a three-dimensional direction, identifying, based on the coordinate data for the particles, a cell in which a center of each of the particles is located, and storing in a cell data memory data which identify the plurality of cells where the centers of the particles are located respectively;

a contact candidate particle pair determination step of focusing attention on one of the particles as a focused particle, and determining, based on the address of each of the cells, that the focused particle and each of other particles, of which the centers are located in adjacent cells to the cell where the focused particle is located, constitute a contact candidate particle pair; the contact candidate particle pair determination step being carried out on each of the particles in each of the cells;

a contact candidate particle pair storing step of storing in a contact candidate particle pair data memory data relating to the contact candidate particle pair determined in the contact candidate particle pair determination step;

a physical quantity computation step of determining whether or not the particles of the contact candidate particle pair are in contact with each other, and computing physical quantities relating to motions of the focused particle, the other particle in contact with the focused particle, and the other particle very likely to come into contact with the focused particle, based on a location of the focused particle after a unit time has elapsed;

a coordinate data updating step of updating the coordinate data for the particles, based on results of computations in the physical quantity computation step;

a physical quantity computation step of determining whether or not the particles of the contact candidate particle pair are in contact with each other, and computing physical quantities relating to motions of the focused particle, the other particle in contact with the focused particle, and the other particle very likely to come into contact with the focused particle, based on a location of the focused particle after a unit time has elapsed;

a coordinate data updating step of updating the coordinate data for the particles, based on results of computations in the physical quantity computation step;

a displacement amount determination step of determining, based on the results of computations in the physical quantity computation step, whether or not an integrated displacement amount of any of the particles constituting the contact candidate particle pairs is equal to or more than ¼ (one-quarter) of the cell;

a contact candidate particle pair data updating step of re-executing the mapping step and the contact candidate particle pair determination step for updating, and then deleting from the contact candidate particle pair data memory data relating to the contact candidate particle pair which was formerly the contact candidate particle pair before the updating but is no longer the contact candidate particle pair after the updating, adding to the contact candidate particle pair data memory data relating to the contact candidate particle pair which was formerly not the contact candidate particle pair before the updating but newly becomes the contact candidate particle pair after the updating, and retaining without alternation in the contact candidate particle pair data memory data relating to the remaining contact candidate particle pairs which are still the contact candidate particle pairs after the updating; and a repetition step of repeating the physical quantity computation step, the coordinate data updating step, and the displacement amount determination step at predetermined time intervals when the integrated displacement amount of any of the particles constituting the contact candidate particle pairs is not determined to be equal to or more than the ¼ (one-quarter) of the cell in the displacement amount determination step.

9. The particle data computing method according to claim 8, wherein in the mapping step, when the plurality of cells are two-dimensionally arranged, the address of the reference cell is set to (0, 0) and the address of other cell is expressed in (±p, ±q), and when the plurality of cells are three-dimensionally arranged, the address of the reference cell is set to (0, 0, 0) and the address of the other cell is expressed in (±p, ±q, ±r), where p, q, and r are integers indicating a number in the arrangement order in which the other cell is located with respect to the reference cell in a plus direction or a minus direction of the respective dimensions; and in the contact candidate particle pair determination step, when the other particle is located in a cell for which absolute values of numeric differences between the address of the reference cell where the focused particle is located and the address of the other cell where the other particle is located are 1 (one) or less, the focused particle and the other particle are determined to be the contact candidate particle pair.

10. The particle data computing method according to claim 8, wherein in the mapping step, when the plurality of cells are two-dimensionally arranged, the address of the reference cell is set to (0, 0) and the address of other cell is expressed in (±p, ±q), and when the plurality of cells are three-dimensionally arranged, the address of the reference cell is set to (0, 0, 0) and the address of the other cell is expressed in (±p, ±q, ±r), where p, q, and r are integers indicating a number in the arrangement order in which the other cell is located with respect to the reference cell in a plus direction or a minus direction of the respective dimensions;

in the contact candidate particle pair determination step, when the other particle is located in a cell for which absolute values of numeric differences between the address of the reference cell where the focused particle is located and the address of the other cell where the other particle is located are 1 (one) or less, the focused particle and the other particle are determined to be the contact candidate particle pair; and in the contact candidate particle pair data updating step, it is checked whether or not absolute values of numeric differences between the addresses of two of the cells where two particles formerly constituting the contact candidate particle pair are located respectively are more than 1 (one), and it is determined that the two particles are no longer the contact candidate particle pair when the absolute values are more than 1 (one); and in respect of the contact candidate particle pair newly determined as a contact candidate particle pair in the contact candidate particle pair determination step, it is checked whether or not absolute values of numeric differences between the addresses of two of the cells where two particles newly determined as a contact candidate particle pair were formerly located respectively are more than 1 (one), and it is determined that the two particles are a contact candidate particle pair which has newly become the contact candidate particle pair after the updating.

11. A particle data computing apparatus that computes particle data used in simulation which is carried out in a computer, based on a discrete element method (DEM), the particle data computing device comprising:

region dividing means for dividing a region including a plurality of particles identified by coordinate data into a plurality of cells;

mapping means for assigning an address to each of the cells obtained at the region dividing step so that, when one of the cells is used as a reference cell, it can be known how many cells other cells are located apart from the reference cell in a two-dimensional direction or a three-dimensional direction, identifying, based on the coordinate data for the particles, a cell in which a center of each of the particles is located, and storing in a cell data memory data which identify the plurality of cells where the centers of the particles are located respectively;

contact candidate particle pair determination means for focusing attention on one of the particles as a focused particle, and determining, based on the address of each of the cells, that the focused particle and each of other particles, of which the centers are located in adjacent cells to the cell where the focused particle is located, constitute a contact candidate particle pair; the contact candidate particle pair determination means being carried out on each of the particles in each of the cells;

a contact candidate particle pair data memory that stores data relating to the contact candidate particle pair determined by the contact candidate particle pair determination means;

physical quantity computation means for determining whether or not the particles of the contact candidate particle pair are in contact with each other, and computing physical quantities relating to motions of the focused particle, the other particle in contact with the focused particle, and the other particle very likely to come into contact with the focused particle, based on a location of the focused particle after a unit time has elapsed;

a physical quantity data memory that stores the results of computations done by the physical quantity computation means;

coordinate data updating means for updating the coordinate data for the particles, based on results of computations done by the physical quantity computation means;

displacement amount determination means for determining, based on the results of computations done by the physical quantity computation means, whether or not an integrated displacement amount of any of the particles constituting the contact candidate particle pairs is equal to or more than $\frac{1}{4}$ (one-quarter) of the cell; and contact candidate particle pair data updating means for re-executing the mapping means and the contact candidate particle pair determination means for updating, and then deleting from the contact candidate particle pair data memory data relating to the contact candidate particle pair which was formerly the contact candidate particle pair before the updating but is no longer the contact candidate particle pair after the updating, adding to the contact candidate particle pair data memory data relating to the contact candidate particle pair which was formerly not the contact candidate particle pair before the updating but newly becomes the contact candidate particle pair after the updating, and retaining without alternation in the contact candidate particle pair data memory data relating to the remaining contact candidate particle pairs which are still the contact candidate particle pairs after the updating, wherein the physical quantity computation means, the coordinate data updating means, and the displacement amount determination means are executed recurrently at predetermined time intervals when the integrated displacement amount of any of the particles constituting the contact candidate particle pairs is not determined to be equal to or more than $\frac{1}{4}$ (one-quarter) of the cell by the displacement amount determination means.

12. The particle data computing apparatus according to claim 11, wherein the contact candidate particle pair data memory stores data in a link list structure, where data relating to each of the contact candidate particle pairs have a reference to subsequent data relating to a subsequent contact candidate particle pair.

* * * * *